United States Patent [19]

Pickett

[11] Patent Number: 4,797,650
[45] Date of Patent: Jan. 10, 1989

[54] CMOS BINARY EQUALS COMPARATOR WITH CARRY IN AND OUT

[75] Inventor: James K. Pickett, Kokomo, Ind.

[73] Assignee: Delco Electronics Corporation, Kokomo, Ind.

[21] Appl. No.: 66,654

[22] Filed: Jun. 25, 1987

[51] Int. Cl.[4] ............................ G05B 1/00; G06F 7/02
[52] U.S. Cl. .................................................. 340/146.2
[58] Field of Search ................... 340/146.2; 307/494, 307/496, 497

[56] References Cited

U.S. PATENT DOCUMENTS

| | | | |
|---|---|---|---|
| 3,137,789 | 6/1964 | Chiapuzio, Jr. | 235/177 |
| 3,305,831 | 2/1967 | Nelson | 340/146.2 |
| 3,492,644 | 1/1970 | Jensen | 340/146.2 |
| 3,500,321 | 8/1970 | Cottrez | 340/146.2 |
| 3,517,175 | 6/1970 | Williams | 235/177 |
| 4,323,982 | 4/1982 | Eichrodt et al. | 340/146.2 |
| 4,694,274 | 9/1987 | Shimada et al. | 340/146.2 |

FOREIGN PATENT DOCUMENTS 0301770  12/1981  Fed. Rep. of Germany ... 340/146.2
2082411   3/1982  United Kingdom ............. 340/146.2

OTHER PUBLICATIONS

Gautier et al., "Two-Bit Words Comparison Circuit", *IBM Technical Disclosure Bulletin*, vol. 18, #8, pp. 2544–2545, Jan. 1976.

Primary Examiner—Gary V. Harkcom
Assistant Examiner—Dale M. Shaw
Attorney, Agent, or Firm—Robert M. Sigler

[57] ABSTRACT

A CMOS binary equals comparator circuit suitable for chaining into an n-bit equals comparator has carry in and carry out terminals with three MOSFETs and an inverter connected to pass through a high carry in voltage to the carry out terminal but to allow the comparison of the first and second bits in additional circuitry to determine the carry out voltage with a low carry in voltage. Further MOSFETs, in one P channel and one N channel pair, are interconnected and provided with the first bit, second bit and complement of the second bit to detect equality of the first and second bits. The circuit uses a small number of transistors per bit for the comparison.

1 Claim, 1 Drawing Sheet

CMOS BINARY EQUALS COMPARATOR WITH CARRY IN AND OUT

BACKGROUND OF THE INVENTION

This invention relates to a CMOS binary equals comparator having carry in and carry out terminals, so that a plurality of such comparators may be chained to form an n-bit binary equals comparator. It may be used where one number is to be compared with another and the complement of the second number is available. the advantage of the comparator is the small number of transistors required for the comparison of each bit.

SUMMARY OF THE INVENTION

The CMOS binary equals comparator circuit of this invention comprises carry in and carry out terminals and a pair of nodes labeled N and P. It further comprises a first N channel MOSFET having a drain connected to the carry out terminal, a source connected to the N node, and a gate connected to the carry in terminal, a first P channel MOSFET having a source connected to the carry out terminal and a drain connected to the P node, and a second N channel MOSFET having a drain connected to the carry out terminal and a source adapted for connection to an electric power supply at a low voltage. An inverter connects the carry in terminal to the gates of the first and second N channel MOSFETs, whereby the low voltage input to the carry in terminal produces the low voltage output on the carry out terminal. Thus, if two or more such circuits are chained, a low voltage in any of the circuits will be carried through to the output.

The circuit further comprises third and fourth N channel MOSFETs having drains connected to the N node and each having a gate connected to the source of the other, the third and fourth N channel MOSFETs having sources adapted to be provided with a first bit voltage and a second bit voltage, respectively, the first and second bit voltages being one of the low voltage or a higher voltage from the electric power supply. Finally, the circuit comprises second and third P channel MOSFETs having sources connected to the P node and each having a gate connected to the drain of the other, the second and third P channel MOSFETs having drains adapted to be provided with the first bit voltage and the complement of the second bit voltage, respectively, wherein the complement of the second bit voltage is the other of the low or higher voltages from the power supply from the second bit voltage. Thus, when the higher voltage from the power supply is provided to the carry in terminal, the carry out terminal is at the higher voltage when the first and second bits are equal and the low voltage when they are not. Only if all circuits of a chain detect equality in the corresponding bits of the two numbers will the output of the last be high, which signifies the equality.

Further details and advantages will be apparent from the accompanying drawing and following description of a preferred embodiment.

DESCRIPTION OF THE PREFERRED EMBODIMENT

Figures 1, 2:
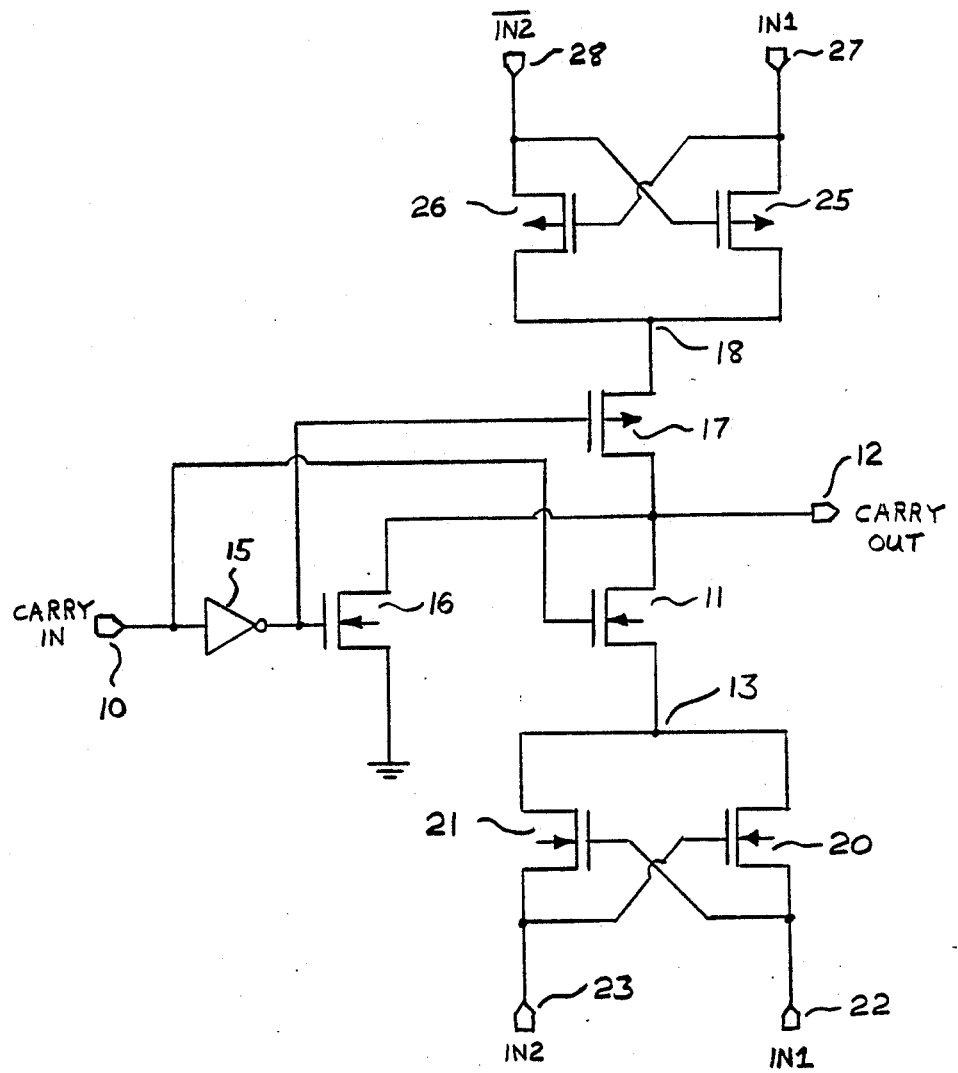
FIG. 1 is a circuit diagram of a preferred embodiment of the invention.
FIG. 2 is a truth table for the circuit of FIG. 1.

Referring to FIG. 1, a carry in terminal 10 is connected to the gate of an N channel MOSFET 11 having a drain connected to a carry out terminal 12 and a source connected to an N node 13. Carry in terminal 10 is further connected through an inverter 15 to the gates of an N channel MOSFET 16 and a P channel MOSFET 17. MOSFET 16 has a grounded source and a drain connected to carry out terminal 12. MOSFET 17 has a source connected to carry out terminal 12 and a drain connected to a P node 18. It may be seen that an input voltage equal to ground applied to carry in terminal 10 causes MOSFETs 11 and 17 to be turned off to isolate carry out terminal 12 from the N and P nodes and further causes MOSFET 16 to be turned on to pull the carry out terminal to the ground voltage. Thus, a ground voltage on the carry in terminal, signifying an inequality on a previously circuit in a chain of such circuits, is passed through each succeeding circuit. However, a voltage higher than ground by at least the turn-on voltage of a MOSFET, when applied to carry in terminal 10, turns of MOSFET 16 and turns on MOSFETs 11 and 17 to make the carry out terminal voltage dependent on the other inputs to the circuit, as will be described. This would occur when all preceding circuits in a chain of such circuits detect equality in the corresponding bits or, if this is the first or only such circuit, if such higher voltage is provided to the carry in terminal by a bias circuit.

N node 13 is connected to the drains of N channel MOSFETs 20 and 21, each of which has a gate connected to the source of the other. Source of MOSFET 20 is further connected to a terminal 22 adapted to receive a first bit; and the source of MOSFET 21 is further connected to a terminal 23, which is adapted to receive a second bit. Each of the first and second bits comprises a voltage which is one of the ground voltage or the higher voltage; and, in the case of n-bit numbers, the first and second bits are corresponding bits of first and second bits n-bit numbers.

P node 18 is connected to the sources of P channel MOSFETs 25 and 26, each of which has a gate connected to the drain of the other. The drain of MOSFE 25 is further connected to a terminal 27 adapted to receive the first bit already mentioned; and the drain of MOSFET 26 is further connected to a terminal 28 adapted to receive the complement of the second bit already mentioned. The complement of the second bit is the other of the ground or higher voltages from that of the second bit and is provided by other means, which could be an inverter from the IN2 terminal if not otherwise provided.

It may be seen that, if carry in terminal 10 is high, so that MOSFETs 11 and 17 are both turned on, and the first bit IN1 is the lower voltage, MOSFET 21 will be turned off and MOSFET 26 will be turned on. If the second bit IN2 is also low, its complement will be high and MOSFETs 20 and 25 will both be off. Thus, carry out terminal 12 will be pulled to the higher voltage on IN2 BAR by transistors 26 and 17; and the circuit will correctly indicate equality for the bits. If, on the other hand, the second bit IN2 is high, MOSFETS 20 and 25 will be turned on and a low voltage will be applied to terminal IN2 BAR. Thus, carry out terminal 12 will be connected to the ground voltage through three paths—MOSFETs 26 and 17, MOSFETs 25 and 17, and MOSFETs 11 and 20—and will, with its resulting ground voltage, correctly indicate inequality for the bits.

If, while the carry in terminal has a high input, the first bit IN1 is high, MOSFETs 21 and 26 are turned on and off, respectively. If the second bit IN2 is low, MOSFETs 20 and 25 are both turned off; and carry out terminal 12 is connected to the low voltage on terminal IN2 through MOSFETs 11 and 21 to indicate an inequality in the bits. If, however, the second bit is high, MOSFETs 20 and 25 are turned on. Carry out terminal 12 is connected to the higher voltage through three paths—MOSFETs 17 and 25, MOSFETs 11 and 20, and MOSFETs 11 and 21—to indicate equality in the first and second bits.

The preceding description of the operation of the circuit of FIG. 1 is summarized in the truth table of FIG. 2. The circuit correctly indicates the equality of the applied first and second bits unless, the circuit being chained with other similar circuits in an n-bit comparator, a previous circuit in the chain indicates an inequality, in which case all subsequent circuits in the chain, including this one, are overridden and pass the inequality signal through.

The embodiments of the invention in which an exclusive property or privilege is claimed are defined as follows:

1. A CMOS binary equals comparator circuit comprising, in combination:

a carry in terminal;

a carry out terminal;

N and P nodes;

a first N channel MOSFET having a drain connected to the carry out terminal, a source connected to the N node, and a gate connected to the carry in terminal;

a first P channel MOSFET having a source connected to the carry out terminal and a drain connected to the P node;

a second N channel MOSFET having a drain connected to the carry out terminal and a source adapted for connection to an electric power supply at a low voltage;

an inverter connecting the carry in terminal to the gates of the first P channel MOSFET and the second N channel MOSFET, whereby the low voltage input to the carry in terminal produces the low voltage output on the carry out terminal;

third and fourth N channel MOSFETs having drains connected to the N node and each having a gate connected to the source of the other, the third and fourth N channel MOSFETs having sources connected to a first bit voltage and a second bit voltage, respectively, the first and second bit voltages being one of the low voltage or a higher voltage from the electric power supply; and second and third P channel MOSFETs having sources connected to the P node and each having a gate connected to the drain of the other, the second and third P channel MOSFETs having drains connected to the first bit voltage and the complement of the second bit voltage, respectively, wherein the complement of the second bit voltage is the other of the low or higher voltages from the power supply from the second bit voltage and whereby, when the higher voltage from the power supply is provided to the carry in terminal, the carry out terminal is at the higher voltage when the first and second bits are equal and the low voltage when they are not.

* * * * *